3,317,486
MERCAPTOETHANOL/MERCAPTOPROPANOL
COPOLYMERS AND PROCESS
Morris B. Berenbaum, Levittown, and Edward Broderick, Perkasie, Pa., and Ray C. Christena, North Ogden, Utah, assignors to Thiokol Chemical Corporation, Bristol, Pa., a corporation of Delaware
No Drawing. Filed Dec. 6, 1962, Ser. No. 242,609
4 Claims. (Cl. 260—79)

The present invention relates to a novel class of copolymers, specifically mercaptoethanol and mercaptopropanol copolymers, and to a process by which they may be prepared.

Mercaptoethanol/mercaptopropanol copolymers exist in physical states ranging from waxes to elastomers to powders, and are thermoplastic in nature. Because of these and other properties, the copolymers are suitable for a wide variety of applications. For example, the elastomeric copolymers, which melt above about 70° C., can be fabricated into relatively large articles by means of injection molding or melt extrusion. The waxy copolymers, which range from soft to hard at room temperature, are suitable for application as greases, lubricants or paper coatings. Copolymers in the powder state are useful as molding powders as well as in instances where mechanical mixtures of the copolymer and other substances must be prepared for a particular application. Fillers and pigments which are commonly used in the polymer art can readily be used with these mercaptoethanol/mercaptopropanol copolymers.

The present invention provides a number of important advantages over the prior art. In the copolymers made according to this invention the monomeric units are linked by monosulfide bonds. These monosulfide bonds do not cause discoloration as do disulfide bonds of the sulfur-containing polymers of the prior art. Moreover, the disulfide linkages of the prior art polysulfide polymers tend to split in the presence of various reagents, e.g., sodium sulfide, and hence are somewhat unstable under certain conditions. Since the present products are linear copolymers having essentially only monosulfide linkages, they are free from this disadvantage of the polysulfide polymers.

Accordingly, an object of the present invention is to provide a novel class of sulfur-containing copolymers, specifically, mercaptoethanol and mercaptopropanol copolymers. Another object of the present invention is to provide a class of sulfur-containing copolymers which exist at room temperature in physical states ranging from waxes to elastomers to powders, and wherein the monomeric units are connected only by monosulfide linkages. A further object of the present invention is to provide a class of monosulfide-linked copolymers which are thermoplastic and thus suitable for relatively low and high temperature applications. Another object of this invention is to provide a process for preparing monosulfide-linked mercaptoethanol/mercaptopropanol copolymers. Other objects of the invention will be in part obvious and in part pointed out hereafter.

It has been found that the novel copolymers of the present invention can be formed by the copolymerization of mercaptoethanol and mercaptopropanol in the presence of certain strong Lewis acid catalysts. Acid catalysts which have been found to be particularly effective in the process according to the present invention include p-toluene sulfonic acid, sulfuric acid, zinc chloride, boron-trifluoride-ether complex and acid clays. The preferred catalyst is p-toluene sulfonic acid. It is important that the catalyst be non-oxidizing relative to the mercaptan groups present and that it remain substantially effective under the copolymerization reaction conditions. The quantity of such catalyst or catalysts used is desirably between about 0.5 and 10 parts by weight per 100 parts by weight of the monomers being copolymerized. The preferred amount of catalyst is between about 1 and 5 parts by weight. A uniform mixture of the catalyst and monomers is desirable for effective catalysis. The rate of the copolymerization reaction increases with increasing catalyst concentration.

According to the present invention, the copolymerization reaction is conducted at a temperature within a range above room temperature. The preferred reaction temperature range is between about 80° and 115° C. That range has been found to be optimum because at higher temperatures acid degradation of the copolymers tends to occur which reduces the yield of the copolymers, while at temperatures below the desired range the copolymerization reaction is relatively slow, and therefore, inefficient.

The copolymerization reaction is a condensation reaction wherein water is split off from the monomers. It is, therefore, desirable to remove the water formed during the copolymerization in order to achieve a faster and more nearly complete reaction. To this end, a water-entraining solvent which can be azeotropically distilled is desirably incorporated in the reaction mixture. The preferred method of conducting the copolymerization reaction is to reflux the reaction mixture of monomeric reactants, catalyst and solvent, together with the water formed in the reaction, in a distillation column, and to remove solvent and water vapor as an azeotropic mixture from the top of the column. The azeotropic mixture is condensed and the solvent portion of the condensate returned to the column as reflux. By selecting a solvent which with a mixture of water has an azeotropic boiling point within the preferred copolymerization reaction temperature range, the temperature of the reaction mixture can be controlled and maintained within the preferred range while simultaneously distilling the solvent and water.

Solvents which can be utilized include benzene, toluene, xylene, ethylene dichloride, and diisopropyl ether, and mixtures of such solvents. Benzene and toluene are preferred solvents because their azeotropic boiling points with water at atmospheric pressure are such as to cause the reaction mixture to be maintained at a temperature close to the optimum temperature. Solvents whose azeotropic boiling points with water are above the preferred reflux temperature range can be used by conducting the reaction under partial vacuum. Solvents whose azeotropic boiling points with water are below the preferred reflux temperature range can be used by conducting the reaction at a pressure above atmospheric pressure. Solvents in quantities of between about 80 and 200 parts by volume per 100 parts by volume of the two monomeric reactants are preferred.

Any mol ratio of mercaptoethanol to mercaptopropanol monomer can be used in the copolymerization reaction of the present invention. The preferred range of mol ratios of mercaptoethanol to mercaptropropanol is from 95:5 to 5:95. The physical states and properties of the copolymeric products are largely dependent upon the mol ratio of the monomeric reactants. For example, it has been unexpectedly found that when a mol ratio of mercaptoethanol to mercaptopropanol between 0.96:1.0 and 1.04:1.0 is used, the copolymers prepared are elastomeric in nature and of relatively high molecular weight. These ratios correspond to mercaptoethanol mol percentages of 49 to 51. Copolymers in the powdery state are prepared by using monomers in a mol ratio of about 95:5 mercaptoethanol to mercaptopropanol. Other mol ratios of the monomers tend to produce copolymers in the waxy state; the preferred waxy copolymers are those prepared from monomers in mol ratios of approximately either 75:25 or 25:75 mols mercaptoethanol to mols mercaptopropanol.

Alpha,beta-mercaptopropanol exists in two isomeric forms, i.e.

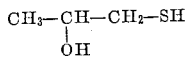

Isomer I and

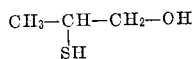

Isomer II

Isomer I is more readily available and the copolymerization reaction proceeds at a somewhat faster rate when this isomer is used. Except for this small difference in the rate of copolymerization, the particular isomeric form of $\alpha,\beta$-mercaptopropanol used is not critical since the physical properties of the resulting copolymers are essentially the same. The structures of the copolymers prepared using the two isomeric forms of $\alpha,\beta$-mercaptopropanol are illustrated in the following equations:

(2)
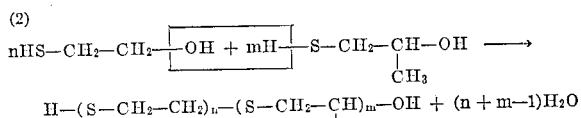

(1)
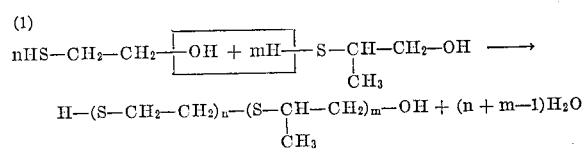

where $n+m$=degree of copolymerization. Isomeric monomeric units are randomly distributed along the copolymer chain. The copolymers will be substantially the same regardless of which isomer of $\alpha,\beta$-mercaptopropanol is used. Therefore, either isomer, or mixtures of the isomers, can be used.

It is desirable to conduct the copolymerization reaction in the presence of an inert atmosphere in order to prevent oxidation of the mercaptan groups, and also to obtain relatively higher molecular weight copolymers. Nitrogen can be used as the inert substance although hydrogen sulfide is preferred since it tends to promote formation of relatively higher molecular weight copolymers.

The copolymers prepared according to the present invention can be stabilized by removal of the acid catalyst used in the copolymerization. Removal of the acid catalyst can be accomplished by several methods. All three forms of the copolymers, i.e., wax, powder and elastomer, are soluble to some extent in hot benzene or toluene. Acids insoluble in benzene or toluene can be separated by dissolution of the copolymer in either of those solvents. Another method of removing the acid catalyst is to neutralize the catalyst with a basic material such as potassium carbonate. In either of the two above methods, the acid-free copolymer can then be obtained by distilling or stripping off under vacuum the water from the neutralizing agent or the solvent. Any remaining inorganic salts can be water washed or filtered from the copolymer product. The simplest and most effective method, and therefore, the preferred method, is to filter a hot solution of the copolymer through a filtering agent such as a highly activated clay contact-absorbent. Filtrol 13, an acid-activated absorbent made from the mineral montmorillonite, is an example of such a filtering agent. The effectiveness of the filtration can be increased by use of materials such as Celite Super Cel, an amorphous diatomaceous earth, in conjunction with the clay absorbent.

Heat stability of the copolymers can be increased by use of antioxidants, e.g., alkylated phenols.

In order to point out more fully the nature of the present invention, the following specific examples are given to illustrate methods of preparing mercaptoethanol/mercaptopropanol copolymers and some properties of the copolymers obtained by using different proportions of monomeric reactants. The examples are not intended to limit in any way the scope of the present invention.

*Example I*

A five-liter reactor, which was equipped with a stirrer, thermometer, nitrogen bubbling tube, condenser and Barrett trap, was charged with 39 grams (0.5 mol) of mercaptoethanol, 46 grams (0.5 mol) of mercaptopropanol, 4 grams of p-toluene sulfonic acid, 75 mls. of benzene and 75 mls. of toluene. Nitrogen was bubbled through the reaction mixture before the reactor was heated and a small nitrogen pressure was maintained in the reactor during the reaction to ensure an inert atmosphere. The reaction mixture was refluxed for three hours at between 90° and 95° C. with water being removed from the system and the solvent being used as reflux. At the end of that period, 17.5 mls. of water had collected in the Barrett trap, and 250 ms. of toluene were added to dilute the reaction mixture which was then further heated for a short time to ensure completion of the condensation reaction. When the formation of water ceased, as indicated by no further collection of water in the Barrett trap, the reactor was cooled to 80° C. Five grams of Filtrol 13 and a few grams of Celite Super-Cel were added to the reaction mixture which was then stirred.

The hot reaction mixture was then filtered through a steam-jacketed Buchner funnel. The clear hot filtrate was poured into Pyrex trays, and the solvent was evaporated in air and then in a vacuum oven at 80 C. A rubbery, thermoplastic copolymer of mercaptoethanol/mercaptopropanol weighing 62.5 grams was thus obtained.

*Example 2*

A five-liter reactor, which was equipped with a stirrer, thermometer, hydrogen sulfide bubbling tube, condenser and Barrett trap, was charged with 780 grams (10 mols) of mercaptoethanol, 920 grams (10 mols) of mercaptopropanol, 32 grams of p-toluene sulfonic acid and 2000 mls. of benzene. Hydrogen sulfide was bubbled through the reaction mixture before the reactor was heated and a small hydrogen sulfide pressure was maintained in the reactor during the reaction. The reactor was heated to reflux the reaction mixture at about 90° C. for 18 hours. At the end of that period 365 mls. of water had collected in the Barrett trap, and 1000 mls. of benzene were added to dilute the reaction mixture. When the formation of water ceased, as indicated by no further collection of water in the Barrett trap, the reaction mixture started to foam. Five hundred mls. of benzene were then added to the reactor, whereupon the reaction mixture stopped foaming. The reactor was cooled to 64° C. and to prevent further foaming, a solution of 36 grams of potassium carbonate dissolved in 40 mls of water was introduced into the reactor dropwise over a 10 minute interval. The reactor was reheated and the reaction mixture was refluxed at about 90° C. until 36.5 mls. of water had collected in the Barrett trap. The reactor was cooled to about 80° C. and a slurry of 500 mls. of toluene and Celite Super-Cel was added to the reaction mixture which was then refluxed for ½ hour.

The hot reaction mixture was filtered through a steam-jacketed Büchner funnel. The clear hot filtrate was poured into Pyrex trays, and the solvent was evaporated in air and then in a vacuum oven at 90° to 100° C. at 3 mm. mercury pressure absolute. A thermoplastic elastomerc product was obtained which had a tensile strength of 800 p.s.i. and an elongation of 950%. A molded object in the shape of a golf ball was made from this copolymer.

*Example 3*

Apparatus as described in Example 2 was charged with 39 grams (0.5 mol) of mercaptoethanol, 46 grams (0.5 mol) of mercaptopropanol, 150 mls. of tluene and 4 grams of a solution consisting of 4 grams of p-toluene sulfonic acid and 4 grams of sulfuric acid. Following a procedure similar to the one described in Example 2, the reaction mixture was refluxed at from 100° to 110° C. for 1½ hours during which time 19.6 mls. of water collected in the Barrett trap. Pieces of a gell-like material which were observed during the refluxing period gradually disappeared. The copolymer mixture was poured into a beaker to which a solution of 95 grams of potassium carbonate in 125 mls of water was then added. The potassium carbonate caused a milky emulsion to form. Two hundred eighty mls. of toluene were added to the beaker which was then heated in a steam bath. Two liquid phases formed which were separated by means of a separatory funnel. The separated upper phase was poured into a Pyrex dish, and the solvent was evaporated in a current of air and then in a vacuum oven at 80° C. at 30 mm. mercury pressure absolute. A rubbery, thermoplastic elastomeric sheet was thus obtained. The sheet was washed with hot water to remove any remaining inorganic salts then dried in the vacuum oven. The dried material weighed 60.5 grams, equivalent to a yield of 91%.

*Example 4*

Apparatus as described in Example 2 was charged with 390 grams (5 mols) of mercaptoethanol, 460 grams (5 mols) of mercaptopropanol, 800 mls. of benzene and 16 grams of p-toluene sulfonic acid. Following a procedure similar to the one described in Example 2, the reaction mixture was refluxed at about 90° for 10 hours at the end of which time 188 mls. of water had collected in the Barrett trap. The reaction mixture was diluted by adding to it 400 mls. of benzene. The reactor was cooled to 50° C. and then a solution of 18 grams of potassium carbonate dissolved in 20 mls. of water was slowly added to neutralize the acid catalyst. Heating was resumed and the reaction mixture was refluxed for ½ hour. The hot reaction mixture was then poured into Pyrex trays. A current of air was used to evaporate the solvent from the reaction mixture which was then placed in a vacuum oven for 24 hours at 80°–90° C. at 30 mm. mercury pressure absolute to evaporate any remaining solvent.

Inorganic salts were removed from the product by washing the product in warm water. The washed product was then dried in a vacuum oven at 80°–90° C. at 30 mm. mercury pressure absolute. The product thus obtained, which weighed 678 grams, was a thermoplastic rubber sheet with elastomeric properties.

*Example 5*

Apparatus as described in Example 2 was charged with 780 grams (10 mols) of mercaptoethanol, 920 grams (10 mols) of mercaptopropanol, 32 grams ofp-toluene sulfonic acid monohydrate and 1000 mls. of benzene. Using a procedure similar to the one described in Example 2, the reaction mixture was refluxed at about 90° C. for 15 hours during which time 376 mls. (20.6 mols) of water had collected in the Barrett trap. One liter of benzene was added to the reactor to dilute the reaction mixture which was then reheated for a short period. Formation of only 2 more mls. of water indicated the reaction was complete and the reactor was cooled to 80° C. The reactor was then charged with 160 grams of Filtrol 13, 100 grams of Celite 545 and 600 mls. of toluene and then stirred for 1½ hours. The hot reaction mixture was filtered through a steam-jacketed Buchner funnel. The clear hot filtrate was poured into Pyrex trays and the solvent was evaporated under a current of air and then in a vacuum oven at 80° C. A solid sheet of a white thermoplastic elastomeric mercaptoethanol/mercaptopropanol copolymer was obtained as a product. The yield was nearly 100%.

*Example 6*

A series of four tests was performed to determine the criticality of the mol ratio of monomers used to prepare waxy rather than elastomeric copolymers. Four mixtures with varying proportions of monomeric reactants were reacted in the presence of 100 mls. of toluene and 1.25 grams of p-toluene sulfonic acid using apparatus and procedure similar to the ones described in Example 2. The reaction mixture was refluxed at between 100° and 110° C. until water no longer formed which indicated the reaction was complete. Six grams of a 1:1 mixture of Filtrol 13 and Celite 535 were then added to the reactor to neutralize the acid catalyst. The hot reaction mixture was filtered through a steam-jacketed Buchner funnel. The hot filtrate was poured into Pyrex trays, and the solvent was evaporated in a current of air and then in a vacuum oven at 70°–80° C. at 30 mm. mercury pressure absolute. The following table shows the weight and mols of monomers used, the mol ratio and the nature of the copolymer obtained in each test:

| Test | Monomer | Weight (in grams) | Mols | Mol Ratio | Nature of Copolymer |
|---|---|---|---|---|---|
| A | Mercaptoethanol | 17.16 | 0.220 | 1.10 | Soft wax. |
|   | Mercaptopropanol | 18.40 | 0.200 |  |  |
| B | Mercaptoethanol | 16.38 | 0.210 | 1.05 | Wax. |
|   | Mercaptopropanol | 18.40 | 0.200 |  |  |
| C | Mercaptoethanol | 15.60 | 0.200 | 0.95 | Rubbery wax. |
|   | Mercaptopropanol | 19.32 | 0.210 |  |  |
| D | Mercaptoethanol | 15.60 | 0.200 | 0.91 | Very soft wax. |
|   | Mercaptopropanol | 20.24 | 0.220 |  |  |

*Example 7*

Apparatus as described in Example 2 was charged with 148.2 grams (1.9 mols) of mercaptoethanol, 9.2 grams (0.1 mol) of mercaptopropanol, 150 mls. of toluene, 150 mls. of benzene and 8 grams of p-toluene sulfonic acid. Using a procedure similar to the one described in Example 2, the reaction mixture was refluxed at 90° to 95° C. for 7½ hours. During that period, 139 mls. of water azeotropically distilled from the reaction mixture and collected in the Barrett trap. A white, solid copolymer, powdery in form, was then filtered from the reaction mixture. The copolymeric product was washed several times with warm water which was stripped and filtered from the copolymer. The copolymer was then dried in a vacuum oven. The melting point of the copolymer was found to be 169°–174° C.

Ten grams of the mercaptoethanol/mercaptopropanol copolymer of mol ratio 95:5 thus prepared were charged into a mold. The mold was heated at from 30° to 184° C. and a molding pressure of 12 tons was applied for 35 minutes. A wafer-shaped object having good physical properties was obtained by the molding process.

*Example 8*

Apparatus as described in Example 2 was charged with 78 grams (1.00 mol) of mercaptoethanol, 93.84 grams (1.02 mols) of mercaptopropanol, 125 mls. of benzene, 125 mls. of toluene and 6 grams of p-toluene sulfonic acid. Following a procedure similar to that described in Example 2, the reaction mixture was refluxed at about 90°–95° C. for 4¾ hours. During that period, 37.5 mls. of water azeotropically distilled from the reaction mixture and collected in the Barrett trap. Refluxing was continued for ½ hour to remove the last traces of water. The reactor was then charged with 35 grams of Filtrol 13 and the reaction mixture refluxed at about 95° C. for 2½ hours during which time the water from the Filtrol 13 collected. The reactor was then cooled. Seventy grams of Celite 545 were introduced into the reactor and the reactor was heated to reflux the reaction mixture at about 95° C. for ½ hour, whereupon the hot reaction mixture was filtered. The hot filtrate was poured into Pyrex trays and the solvent was evaporated in a current of air and then in a vacuum oven at 80° to 90° C. at 30 mm. mercury pressure absolute. The dried product, which weighed 120 grams, was an elastomer which could be readily molded.

*Example 9*

Apparatus as described in Example 2 was charged with 79.56 grams (1.02 mols) of mercaptoethanol, 92 grams (1 mol) of mercaptopropanol, 125 mls. of benzene, 125 mls. of toluene and 6 grams of p-toluene sulfonic acid. Using a procedure similar to the one described in Example 2, the reaction mixture was refluxed at about 95° C. for 4 hours during which time water azeotropically distilled off. Refluxing was continued for one hour to remove any traces of water, and then 35 grams of Filtrol 13 were added to the reactor. The reaction mixture was refluxed again until all the water from the Filtrol 13 was removed. The reactor was then cooled, charged with 70 grams of Celite 545 and was heated to reflux the reaction mixture for ½ hour. The reaction mixture was filtered while hot and the filtrate was poured into Pyrex trays. Solvent was evaporated from the filtrate in a current of air and then in a vacuum oven at 80° to 90° C. at 30 mm. mercury pressure absolute. A rubbery, thermoplastic copolymer weighing 119 grams was thus obtained.

In all the foregoing examples, samples were withdrawn from the reaction mixture during the copolymerization reaction. These samples were taken when the reaction were 19%, 50%, 67% and 100% complete as determined by the amount of water removed from the reaction mixture. Gas chromatography analyses clearly indicated that when the reactions were 50% complete, nearly all the free monomeric reactants had been converted to dimers. Infrared analyses indicated that the —OH and —SH bonds within the copolymers became weaker as the copolymerization reaction progressed and became too faint to be detected when the reaction was about 90% complete. There is some evidence that double bonds were being formed to a slight extent.

It is of course to be understood that numerous changes in reaction conditions, proportions of reactants, solvents and catalysts as set forth in the examples can be made without departing from the spirit of the present invention as defined in the claims hereafter appended.

We claim:
1. A method of making a mercaptoethanol/mercaptopropanol copolymer which comprises condensing mercaptoethanol and alpha,beta-mercaptopropanol monomers in the presence of 0.5 to 10 parts by weight of an acid catalyst selected from the group consisting of p-toluene sulfonic acid, sulfuric acid, zinc chloride and boron trifluoride-ether complex per 100 parts by weight of said monomers at a temperature in the range between 80° and 115° C., stabilizing the copolymeric product by removing residual acid catalyst values from the reaction mixture, and recovering the condensation product in substantially pure form.

2. A method according to claim 1 and wherein said catalyst is p-toluene sulfonic acid.

3. A method of making a mercaptoethanol/mercaptopropanol copolymer which comprises condensing mercaptoethanol and alpha,beta-mercaptopropanol monomers in the presence of 0.5 to 10 parts by weight of an acid catalyst selected from the group consisting of p-toluene sulfonic acid, sulfuric acid, zinc chloride and boron trifluoride-ether complex per 100 parts by weight of said monomers at a temperature in the range between 80° and 115° C. in the presence of at least one inert solvent, removing water formed during the condensation by azeotropic distillation of said water and said solvent, stabilizing the copolymeric product by removing residual acid catalyst values from the reaction mixture, and recovering the condensation product in substantially pure form.

4. An elastomeric copolymer which consists of the condensation product of about 49 to 51 mol percent mercaptoethanol and about 51 to 49 mol percent alpha,beta-mercaptopropanol.

References Cited by the Examiner

UNITED STATES PATENTS

| | | | |
|---|---|---|---|
| 2,201,884 | 5/1940 | Carothers | 260—79.1 |
| 2,534,366 | 12/1950 | Noether | 260—79.1 |

OTHER REFERENCES

Reid, Organic Chem. of Bivalent Sulfur, vol. 1, published by Chemical Publishing Co. Inc., New York© 1958 pp. 376–383.

C. R. Noller Textbook of Organic Chem.© 1951 W. B. Saunders Co., Philadelphia, Pa. (p. 192).

LEON J. BERCOVITZ, *Primary Examiner.*

GEORGE F. LESMES, *Examiner.*

M. P. HENDERCKSON, M. I. MARQUIS,
*Assistant Examiners.*